United States Patent
Minei et al.

(10) Patent No.: US 9,428,225 B2
(45) Date of Patent: Aug. 30, 2016

(54) VEHICLE PANEL JOINT STRUCTURE

(71) Applicant: TOYOTA JIDOSHA KABUSHIKI KAISHA, Toyota-shi, Aichi-ken (JP)

(72) Inventors: Taichi Minei, Toyota (JP); Atsushi Mikuni, Toyota (JP); Satoshi Ogawa, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/747,712

(22) Filed: Jun. 23, 2015

(65) Prior Publication Data

US 2015/0375796 A1  Dec. 31, 2015

(30) Foreign Application Priority Data

Jun. 30, 2014  (JP) ................................ 2014-135060

(51) Int. Cl.
*B62D 27/00* (2006.01)
*B62D 27/02* (2006.01)

(52) U.S. Cl.
CPC .................... *B62D 27/026* (2013.01)

(58) Field of Classification Search
CPC ..... B60R 21/045; B60R 21/02; B62D 25/06; B62D 1/28; B65F 3/20; B60J 3/0208; B60P 3/08; G07B 15/063; G01S 13/931; G01C 21/28
USPC .......... 296/29, 187.02, 191, 193.11
See application file for complete search history.

(56) References Cited

U.S. PATENT DOCUMENTS

| | | | | |
|---|---|---|---|---|
| 3,680,910 | A * | 8/1972 | Stanner | B60J 5/101 29/513 |
| 3,909,918 | A * | 10/1975 | Takizawa | B21D 39/021 29/509 |
| 3,909,919 | A * | 10/1975 | Miyabayashi | B21D 39/021 29/509 |
| 4,227,824 | A * | 10/1980 | Ikawa | B60J 5/0469 403/271 |
| 4,679,290 | A * | 7/1987 | Adell | B60R 13/043 29/407.09 |
| 4,719,689 | A * | 1/1988 | Yamamoto | B21D 39/02 156/295 |
| 4,916,284 | A * | 4/1990 | Petrick | B23K 26/16 219/121.64 |

(Continued)

FOREIGN PATENT DOCUMENTS

| | | |
|---|---|---|
| DE | 4432908 A1 | 7/1997 |
| DE | 102009059984 A1 | 6/2011 |

(Continued)

OTHER PUBLICATIONS

Apr. 8, 2016 Office Action issued in German Patent Application No. 102015211721.9.

*Primary Examiner* — Kiran B Patel
(74) *Attorney, Agent, or Firm* — Oliff PLC

(57) ABSTRACT

A vehicle panel joint structure comprises a pair of vehicle panels formed of a first vehicle panel and a second vehicle panel that have different linear expansion coefficients to each other; a hemming portion that is formed by folding over an end portion at an outer edge portion of the first vehicle panel; a rib portion that is formed at a leading end of an end portion at an outer edge portion of the second vehicle panel, that projects out toward the hemming portion of the first vehicle panel, and that contacts the hemming portion; and an adhesive layer that is formed between the outer edge portions of the pair of vehicle panels, and that joins the outer edge portions together.

6 Claims, 3 Drawing Sheets

(56) References Cited

U.S. PATENT DOCUMENTS

| | | | | |
|---|---|---|---|---|
| 5,224,253 A * | 7/1993 | Sawa | B21D 39/021 | 29/243.5 |
| 5,237,734 A * | 8/1993 | Polon | B21D 39/02 | 29/243.58 |
| 5,267,387 A * | 12/1993 | Sawa | B21D 39/021 | 29/509 |
| 5,273,606 A * | 12/1993 | Greve | B62D 27/026 | 156/216 |
| 5,451,742 A * | 9/1995 | Nishio | B23K 26/22 | 219/121.64 |
| 5,470,416 A * | 11/1995 | Herring, Jr. | B21D 39/021 | 137/268 |
| 5,749,992 A * | 5/1998 | Eklund | C09J 5/10 | 156/212 |
| 5,948,185 A * | 9/1999 | Krajewski | B21D 39/02 | 148/415 |
| 6,000,118 A * | 12/1999 | Biernat | B21D 39/02 | 156/196 |
| 6,368,008 B1 * | 4/2002 | Biernat | B62D 27/026 | 29/458 |
| 6,523,244 B1 * | 2/2003 | Bissonnette | B21D 39/021 | 29/243.5 |
| 6,528,176 B1 * | 3/2003 | Asai | B21D 39/021 | 29/521 |
| 6,696,147 B1 * | 2/2004 | Herring, Jr. | B21D 39/021 | 428/323 |
| 6,742,258 B2 * | 6/2004 | Tarbutton | B21D 26/033 | 29/421.1 |
| 6,927,370 B2 * | 8/2005 | McClure | B21D 26/14 | 219/603 |
| 6,928,848 B2 * | 8/2005 | Golovashchenko | B21D 5/04 | 29/243.58 |
| 7,004,536 B2 * | 2/2006 | Wieber | B62D 27/026 | 296/146.6 |
| 7,520,560 B2 * | 4/2009 | Frank | B62D 25/02 | 296/193.05 |
| 7,523,982 B2 * | 4/2009 | Yamaguchi | B60R 13/04 | 296/209 |
| 8,042,372 B2 * | 10/2011 | Carsley | B21D 39/021 | 29/243.58 |
| 8,087,720 B2 * | 1/2012 | Wang | B62D 25/105 | 29/509 |
| 8,114,242 B2 * | 2/2012 | Cai | B60J 5/0469 | 156/295 |
| 8,341,992 B2 * | 1/2013 | Vanimisetti | B21D 39/021 | 72/114 |
| 8,592,733 B2 * | 11/2013 | Ghiran | B23K 13/01 | 219/55 |
| 8,602,482 B2 * | 12/2013 | Song | B21D 39/021 | 296/146.5 |
| 8,632,118 B2 * | 1/2014 | Song | B62D 27/026 | 156/216 |
| 9,169,860 B2 * | 10/2015 | Itoh | F16B 5/08 | |
| 9,211,918 B2 * | 12/2015 | Magnusson | B62D 29/048 | |
| 2003/0067187 A1 * | 4/2003 | Curtiss | B60J 5/0469 | 296/146.5 |
| 2003/0069335 A1 * | 4/2003 | Czaplicki | B62D 27/026 | 523/403 |
| 2004/0079478 A1 * | 4/2004 | Merz | B60R 13/06 | 156/275.7 |
| 2009/0278371 A1 * | 11/2009 | Fuchs | B23K 11/11 | 296/29 |
| 2012/0202013 A1 * | 8/2012 | Song | B21D 39/02 | 428/174 |
| 2012/0248811 A1 * | 10/2012 | Song | B21D 5/16 | 296/76 |
| 2016/0023293 A1 * | 1/2016 | Kurokawa | B23K 1/0056 | 296/29 |

FOREIGN PATENT DOCUMENTS

| | | |
|---|---|---|
| JP | S58-67566 A | 4/1983 |
| JP | 2004-130986 A | 4/2004 |
| JP | 2007-118852 A | 5/2007 |
| JP | 2009-126481 A | 6/2009 |
| JP | 2009-178750 A | 8/2009 |
| JP | 2013-184198 A | 9/2013 |

* cited by examiner

VEHICLE PANEL JOINT STRUCTURE

CROSS-REFERENCE TO RELATED APPLICATION

This application claims priority under 35 USC 119 from Japanese Patent Application, No. 2014-135060 filed Jun. 30, 2014, the disclosure of which is incorporated by reference herein.

BACKGROUND OF THE INVENTION

1. Technical Field

The present invention relates to a vehicle panel joint structure.

2. Related Art

Japanese Patent Application Laid-Open (JP-A) No. 2009-178750 describes technology relating to a method of configuring a vehicle body member in which an end edge portion of an inner panel and an end edge portion of an outer panel are joined together by hemming. In this technology, by sandwiching a resilient adhesive into a hemming join portion, stress is absorbed by resilient deformation of the adhesive, even when distortion stress, due to a difference in linear expansion coefficients of both panels, is imparted to the hemming join portion by heat input during curing of the adhesive.

Thus in cases in which the outer panel and the inner panel with different linear expansion coefficients are joined by hemming, there is a possibility of the panels distorting due to a difference in expansion or contraction displacement, that may occur due to the difference in the linear expansion coefficients of both panels, when there is a change in temperature during a paint drying process or the like after joining by hemming (after the adhesive has cured). Thus there is room for improvement with respect to a joint structure of vehicle panels with different linear expansion coefficients.

Note that other related technology is described in JP-A No. S58-067566, JP-A No. 2007-118852, and JP-A No. 2009-126481.

SUMMARY

In consideration of the above circumstances, a subject of the present invention is to provide a vehicle panel joint structure capable of effectively suppressing distortion of vehicle panels with different linear expansion coefficients due to a change in temperature.

A vehicle panel joint structure of a first aspect of the present invention includes a pair of vehicle panels formed of a first vehicle panel and a second vehicle panel that have different linear expansion coefficients to each other, a hemming portion that is formed by folding over an end portion at an outer edge portion of the first vehicle panel, a rib portion that is formed at a leading end of an end portion at an outer edge portion of the second vehicle panel, that projects out toward the hemming portion of the first vehicle panel, and that contacts the hemming portion, and an adhesive layer that is formed between the outer edge portions of the pair of vehicle panels, and that joins the outer edge portions together.

In the vehicle panel joint structure of the first aspect, the adhesive layer formed between the outer edge portions of the pair of vehicle panels joins the outer edge portions together. Thus the difference in expansion or contraction displacement, which may occur due to the difference in the linear expansion coefficients of the pair of vehicle panels during a change in temperature, is absorbed by the adhesive layer stretching, whereby distortion of the vehicle panels is suppressed.

The outer edge portions are joined together by the adhesive layer in a state in which the rib portion, formed at the leading end of the end portion at the outer edge portion of the second vehicle panel, contacts the hemming portion of the end portion at the outer edge portion of the first vehicle panel.

Thus the layer thickness of the adhesive layer can easily be made thicker than in a case in which the rib portion is not formed, such that distortion, due to a change in temperature, of vehicle panels with different linear expansion coefficients is effectively suppressed.

A vehicle panel joint structure of a second aspect of the present invention is the structure of the first aspect, wherein a contact position where the rib portion contacts the hemming portion is set such that a distance from a leading end of the hemming portion to the contact position is a displacement difference or greater, wherein the displacement difference is generated at the pair of vehicle panels due to the difference in the linear expansion coefficients of the pair of vehicle panels.

In the vehicle panel joint structure of the second aspect, the contact position at which the rib portion contacts the hemming portion is changed due to the displacement difference of the vehicle panels during a change in temperature. However, the contact position where the rib portion contacts the hemming portion is set such that the distance from the leading end of the hemming portion to the contact position is the displacement difference or greater, which displacement difference is generated due to the difference in the linear expansion coefficients of the pair of vehicle panels. This prevents the rib portion from detaching from the folded-over portion, and the rib portion and the hemming portion from separating.

A vehicle panel joint structure of a third aspect of the present invention is the structure of the first aspect or the second aspect, wherein the adhesive layer is formed in a gap between the hemming portion of the first vehicle panel and the end portion at the outer edge portion of the second vehicle panel.

In the vehicle panel joint structure of the third aspect, the adhesive layer is formed not only between the outer edge portions of the pair of vehicle panels, but also in the gap between the hemming portion of the first vehicle panel and the end portion at the outer edge portion of the second vehicle panel, such that water ingress into the gap is prevented. Thus water resistance performance of the outer edge portions of the vehicle panels is improved.

A vehicle panel joint structure of a fourth aspect of the present invention is the structure of any one of the first aspect to the third aspect, wherein the pair of vehicle panels is formed by an outer panel that is disposed at an vehicle outside and formed of a metal material, and an inner panel that is disposed at an vehicle inside of the outer panel and formed of a resin material.

In the vehicle panel joint structure of the fourth aspect, the outer panel is formed of a metal material, and the inner panel is formed of a resin material. Creep is more liable to occur in the inner panel formed of resin material than in the outer panel formed of metal material. However, the displacement difference occurring due to the difference in linear expansion coefficients between the outer panel and the inner panel is absorbed by the adhesive layer stretching, such that creep in the inner panel formed of resin material is prevented or suppressed from occurring.

A vehicle panel joint structure of a fifth aspect of the present invention is the structure of any one of the first aspect to the fourth aspect, wherein the outer edge portion of the first vehicle panel and the outer edge portion of the second vehicle panel face each other through mutual faces, and a distance between outer edge portions of the facing pair of vehicle panels is determined by the displacement difference generated at the pair of vehicle panels due to the difference in the linear expansion coefficients of the pair of vehicle panels, and by a stretch ratio of the adhesive layer due to a change in temperature.

In the vehicle panel joint structure of the fifth aspect, the distance between outer edge portions of the pair of vehicle panels that face each other through mutual faces is determined by the displacement difference generated at the pair of vehicle panels due to the difference in the linear expansion coefficients of the pair of vehicle panels, and by the stretch ratio of the adhesive layer due to a change in temperature, such that the difference in expansion or contraction displacement occurring at the pair of vehicle panels due to the difference in the linear expansion coefficients of the pair of vehicle panels is absorbed by the adhesive layer stretching. Distortion of the vehicle panels is accordingly suppressed.

A vehicle panel joint structure of a sixth aspect of the present invention is the structure of the fifth aspect, wherein the distance between outer edge portions of the facing pair of vehicle panels is determined by a distance by which the rib portion formed at the leading end of the end portion at the outer edge portion of the second vehicle panel projects out toward the hemming portion of the first vehicle panel.

In the vehicle panel joint structure of the sixth aspect, the distance between outer edge portions of the facing pair of vehicle panels is determined by the distance by which the rib portion formed at the second vehicle panel projects out toward the hemming portion of the first vehicle panel, such that the difference in expansion or contraction displacement occurring at the pair of the vehicle panels due to the difference in the linear expansion coefficients of the vehicle panels is absorbed by the adhesive layer stretching. Distortion of the vehicle panels is accordingly suppressed.

The vehicle panel joint structure of the first aspect enables distortion of vehicle panels with different linear expansion coefficients occurring due to a change in temperature to be effectively suppressed.

The vehicle panel joint structure of the second aspect enables the rib portion to be prevented from separating from the hemming portion due to a change in temperature.

The vehicle panel joint structure of the third aspect improves the water resistance performance of the outer edge portions of the vehicle panels.

The vehicle panel joint structure of the fourth aspect enables the occurrence of creep in the inner panel formed of a resin material to be prevented or suppressed.

The vehicle panel joint structure of the fifth aspect enables distortion of vehicle panels with different linear expansion coefficients occurring due to a change in temperature to be more effectively suppressed.

The vehicle panel joint structure of the sixth aspect enables distortion of vehicle panels with different linear expansion coefficients occurring due to a change in temperature to be more effectively suppressed.

BRIEF DESCRIPTION OF THE DRAWINGS

Embodiments of the present invention will be described in detail based on the following figures, wherein.

DETAILED DESCRIPTION OF THE INVENTION

Explanation follows regarding a vehicle panel joint structure according to an exemplary embodiment of the present invention, with reference to FIG. 1 to FIG. 3B.

Joint Structure

Figure 1:
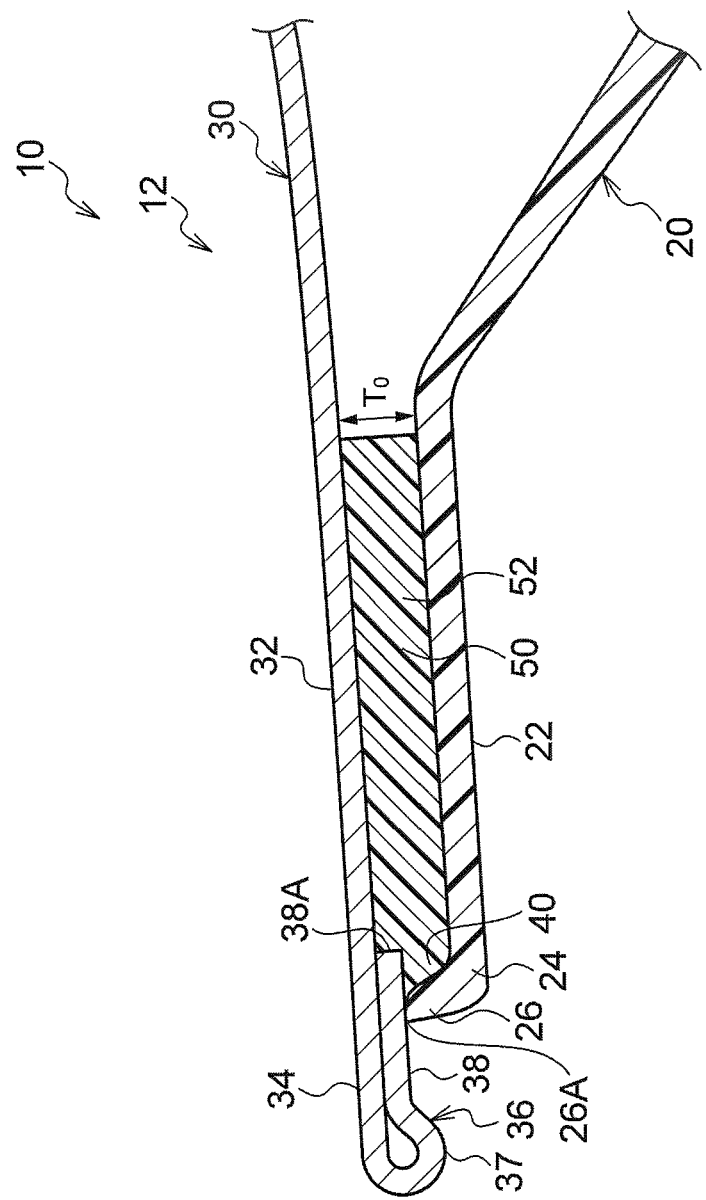
FIG. 1 is a cross-section of relevant portions of an engine hood applied with a vehicle panel joint structure according to an exemplary embodiment of the present invention.

FIG. 1 illustrates relevant portions of an engine hood 12 applied with a vehicle panel joint structure 10 of the present exemplary embodiment. The engine hood 12 is formed including an inner panel 20 disposed at the vehicle inside, and an outer panel 30 that is disposed at the vehicle outside and has a larger external profile than the inner panel 20.

The inner panel 20 and the outer panel 30 are formed of materials with different linear expansion coefficients to each other. In the present exemplary embodiment, the inner panel 20 is made by a material that has a smaller linear expansion coefficient than the outer panel 30. Specifically, a resin material (such as carbon fiber reinforced plastic (CFRP)) is employed for the inner panel 20, and a metal material (such as aluminum alloy or steel plate) is employed for the outer panel 30.

Figure 2:
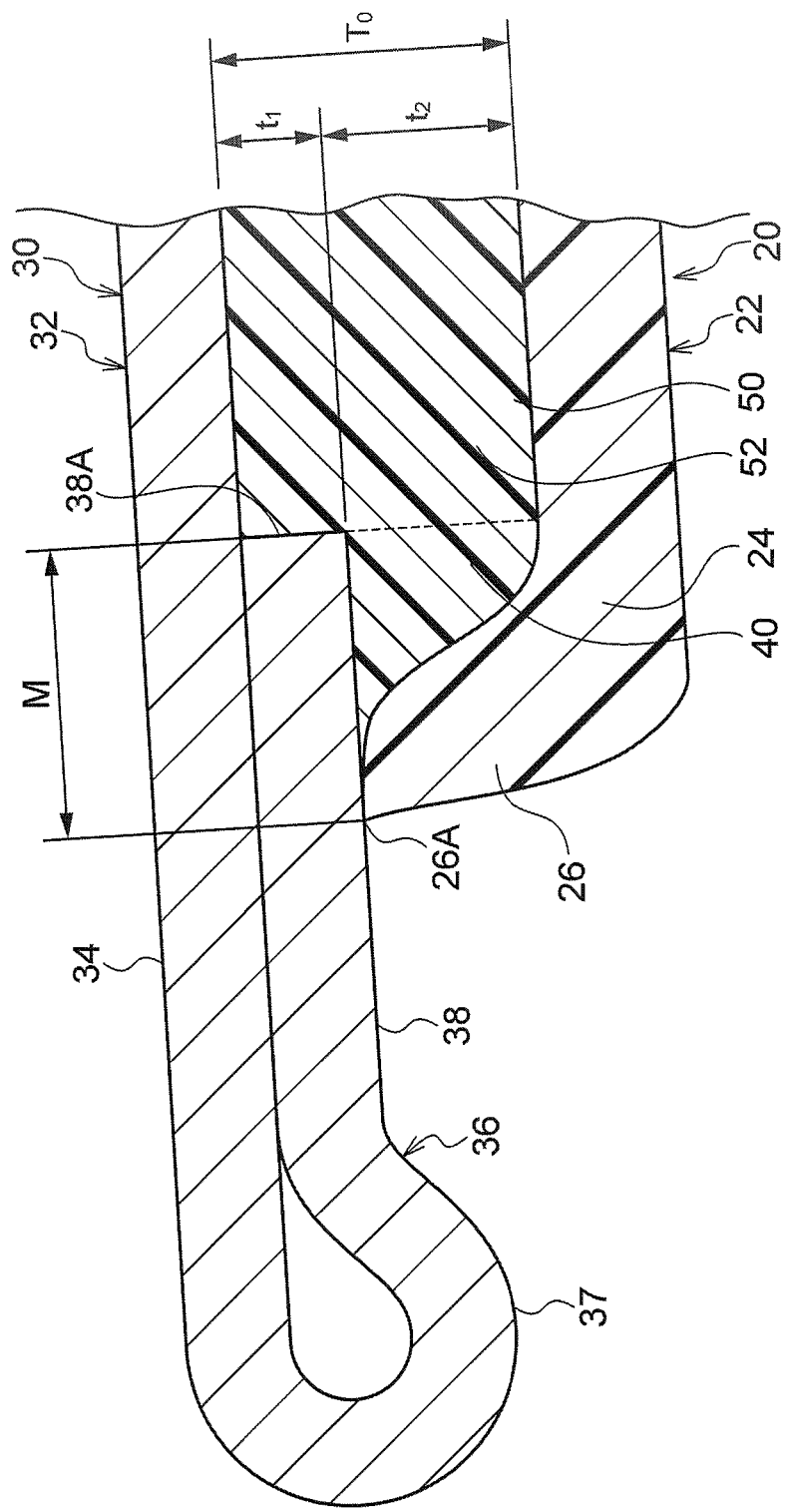
FIG. 2 is an enlarged cross-section of relevant portions in FIG. 1.

As illustrated in FIG. 1 and FIG. 2, a hemming portion 36, formed by folding over an end portion 34, is provided at an outer edge portion 32 of the outer panel 30. The hemming portion 36 of the present exemplary embodiment is configured by a hemming end portion 37 rounded into a hollow shape protruding toward the vehicle inside, and a folded-over portion 38 at which the panels overlap each other.

An end portion 24 of an outer edge portion 22 of the inner panel 20 is disposed at the outside (the vehicle inside) of the folded-over portion 38 of the hemming portion 36 of the outer panel 30. A rib portion 26, which projects out toward the folded-over portion 38 of the hemming portion 36 and contacts the folded-over portion 38, is formed at a leading end of the end portion 24 at the outer edge portion 22 of the inner panel 20.

As illustrated in FIG. 2, a contact position (leading end position) 26A of the rib portion 26 is set at a distance M from a leading end 38A of the folded-over portion 38 of the hemming portion 36. In other words, a width of overlap between the end portion 24 of the inner panel 20 and the folded-over portion 38 of the outer panel 30 is M. The distance M is set at a displacement difference ΔL or greater, which displacement difference ΔL is generated due to the difference in linear expansion coefficients of the inner panel 20 and the outer panel 30, described later, (see FIG. 3B).

As illustrated in FIG. 1 and FIG. 2, an adhesive layer 52 is formed by an adhesive 50 filled between the outer edge portion 32 of the outer panel 30 and the outer edge portion 22 of the inner panel 20, such that the outer edge portion 32 of the outer panel 30 is joined together with the outer edge portion 22 of the inner panel 20. To explain from a different perspective, the outer edge portion 32 of the outer panel 30 and the outer edge portion 22 of the inner panel 20 are joined together by the adhesive 50 (adhesive layer 52), in a state in which the rib portion 26 of the outer edge portion 22 of the inner panel 20 abuts the folded-over portion 38 of the hemming portion 36 of the outer panel 30.

Note that, as illustrated in FIG. 2, a gap 40, this being a location at which the end portion 24 of the outer edge portion 22 of the inner panel 20 and the folded-over portion 38 of the outer panel 30 overlap, is also filled with the adhesive 50, such that the adhesive layer 52 is also formed in the gap 40.

Operation and Advantageous Effects

Explanation follows regarding operation and advantageous effects of the present exemplary embodiment.

As illustrated in FIG. 1 and FIG. 2, the end portion 24 of the outer edge portion 22 of the inner panel 20 is disposed at the outside (the vehicle inside) of the folded-over portion 38 of the hemming portion 36 of the outer panel 30. Moreover, the outer edge portion 32 of the outer panel 30 and the outer edge portion 22 of the inner panel 20 are joined together by the adhesive layer 52 (adhesive 50), in a state in which the rib portion 26 of the inner panel 20 abuts the folded-over portion 38 of the hemming portion 36 of the outer panel 30.

Since the inner panel 20 is formed of a resin material, and the outer panel 30 is formed of a metal material, the inner panel 20 has a smaller linear expansion coefficient than the outer panel 30. Thus a difference in expansion or contraction displacement occurs between the outer panel 30 and the inner panel 20 due to the difference in linear expansion coefficients, when the temperature changes in a paint drying process or the like after the adhesive 50 has cured. However, the difference in expansion or contraction displacement between the outer panel 30 and the inner panel 20 is absorbed by the adhesive layer 52 (adhesive 50) stretching.

As illustrated in FIG. 2, since joining is made in a state in which the rib portion 26 abuts the folded-over portion 38, a necessary layer thickness $T_0$ of the adhesive layer 52 is easily secured by the rib portion 26 such that the adhesive layer 52 is stretched and absorbs the difference in expansion or contraction displacement between the outer panel 30 and the inner panel 20. Thus distortion of the outer panel 30 and the inner panel 20 is effectively suppressed.

Moreover, the adhesive layer 52 is formed between the outer edge portion 22 of the inner panel 20 and the outer edge portion 32 of the outer panel 30, such that corrosion of the outer edge portion 32 of the outer panel 30 is prevented or suppressed.

Furthermore, the gap 40, this being the location at which the end portion 24 of the outer edge portion 22 of the inner panel 20 and the folded-over portion 38 of the hemming portion 36 of the outer panel 30 overlap each other, is also filled with the adhesive 50, forming the adhesive layer 52, such that ingress of water into the gap 40 is prevented. Thus corrosion of the outer panel 30 due to water ingress into the gap 40 is prevented or suppressed.

Creep is, for example, more liable to occur within hot atmosphere, such in a paint drying process or the like, in the inner panel 20 formed of resin material than in the outer panel 30 formed of metal material. However, the displacement difference between the outer panel 30 and the inner panel 20 is absorbed by the adhesive layer 52 (adhesive 50) stretching as described above, such that creep in the inner panel 20 formed of resin material is prevented or suppressed from occurring.

Figure 3B:
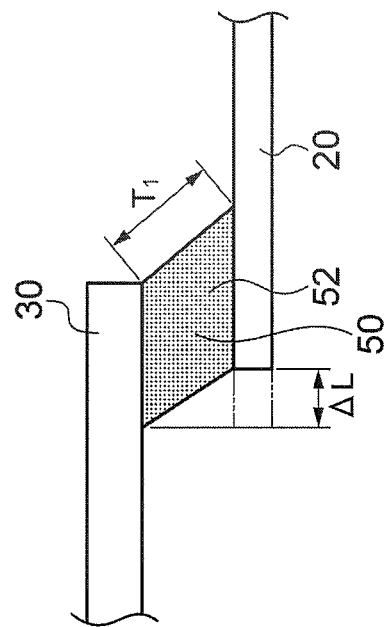
FIG. 3B is an explanatory drawing to explain a displacement difference between an inner panel and an outer panel due to a change in temperature, and stretching of an adhesive layer.
Figure 3A:
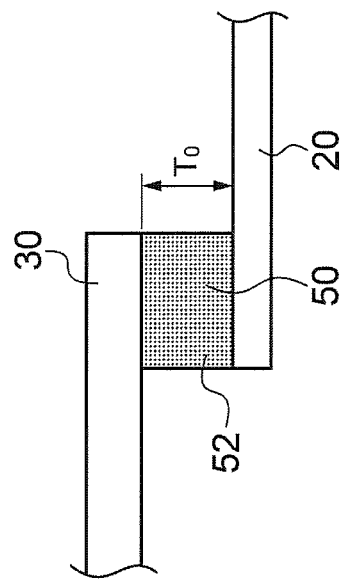
FIG. 3A is an explanatory drawing to explain a displacement difference between an inner panel and an outer panel due to a change in temperature, and stretching of an adhesive layer.

FIG. 3A and FIG. 3B are explanatory drawings (model drawings) illustrating models of the join location of the inner panel 20 to the outer panel 30, in order to explain the displacement difference between the inner panel 20 and the outer panel 30, and the stretching of the adhesive layer 52 (adhesive 50). Note that the hemming portion 36, the rib portion 26, and so on are not shown in FIGS. 3A and 3B, in order to simplify the explanation.

A stretch ratio S of the adhesive layer 52 due to change in temperature is shown in Equation 1, where $T_0$ is the layer thickness of the adhesive layer 52 in an initial state, $T_1$ is a layer thickness of the adhesive layer 52 in a stretched state (envisaged maximum value) due to change in temperature, and $\Delta L$ is the displacement difference between the inner panel 20 and the outer panel 30 (envisaged maximum value) due to change in temperature.

$$S = \frac{T_1}{T_0} = \sqrt{1 + \frac{\Delta L^2}{T_0^2}} \qquad \text{Equation 1}$$

The adhesive layer 52 needs to stretch up to the layer thickness $T_1$ in order for the adhesive layer 52 to sufficiently absorb the displacement difference $\Delta L$ between the inner panel 20 and the outer panel 30, which displacement difference $\Delta L$ is generated due to the difference in linear expansion coefficients of the inner panel 20 and the outer panel 30. The possible stretch ratio S is determined according to the type of the adhesive 50. Thus by determining the layer thickness $T_0$ in the initial state such that the stretch ratio S is the threshold value of the adhesive 50 or below, the adhesive layer 52 stretches up to the layer thickness $T_1$, and the displacement difference $\Delta L$ due to the difference in linear expansion coefficients is sufficiently absorbed by the adhesive layer 52.

The layer thickness $T_0$ of the adhesive layer 52 in the initial state is the sum of a plate thickness $t_1$ of the folded-over portion 38 of the hemming portion 36, and a height $t_2$ of the rib portion 26 ($T_0=t_1+t_2$, see FIG. 2). Thus the necessary layer thickness $T_0$ in the initial state can be secured by adjusting the height $t_2$ of the rib portion 26 whereby the adhesive layer 52 is stretched and absorbs the displacement difference $\Delta L$ due to the difference in the linear expansion coefficients between the inner panel 20 and the outer panel 30.

Thus in the present exemplary embodiment, by determining the height $t_2$ of the rib portion 26 such that the stretch ratio S of the adhesive 50 (see Equation 1) is set at a threshold value of the stretch ratio of the adhesive 50, or below, the necessary layer thickness $T_0$ in the initial state (layer thickness $T_1$ after stretching) is secured, and the displacement difference $\Delta L$ between the inner panel 20 and the outer panel 30 due to the difference in the linear expansion coefficients is absorbed by the adhesive layer 52 stretching.

The contact position 26A, at which the rib portion 26 of the inner panel 20 contacts the folded-over portion 38 of the hemming portion 36 of the outer panel 30, as illustrated in FIG. 2, changes by the displacement difference $\Delta L$ (see FIG. 3B) during a change in temperature. In the present exemplary embodiment, the distance M from the leading end 38A of the folded-over portion 38 (hemming portion 36) to the contact position 26A of the rib portion 26 is set at the displacement difference $\Delta L$ (see FIG. 3B) or greater. This prevents the rib portion 26 from detaching from the folded-over portion 38, and the rib portion 26 and folded-over portion 38 from separating (positional displacement).

Other

Note that the present invention is not limited to the above exemplary embodiment.

For example, the present invention has been applied to the engine hood 12 configured including the inner panel 20 disposed at the vehicle inside and the outer panel 30 disposed at the vehicle outside, however configuration is not limited thereto. The present invention may be applied to joint structures of a pair of vehicle panels, such as in a side door, a back door, or a trunk door.

Moreover, there is no limitation to the placement of the pair of vehicle panels, and the placement direction may be set as appropriate.

Moreover, the materials configuring the pair of vehicle panels are not limited to a combination of a resin material and a metal material. For example, a pair of vehicle panels formed of two metal materials with different linear expansion coefficients to each other may be employed.

It goes without saying that various embodiments may be implemented within a range not departing from the spirit of the present invention.

What is claimed is:

1. A vehicle panel joint structure comprising:
    a pair of vehicle panels formed of a first vehicle panel and a second vehicle panel that have different linear expansion coefficients to each other;
    a hemming portion that is formed by folding over an end portion at an outer edge portion of the first vehicle panel;
    a rib portion that is formed at a leading end of an end portion at an outer edge portion of the second vehicle panel, that projects out toward the hemming portion of the first vehicle panel, and that contacts the hemming portion; and
    an adhesive layer that is formed between the outer edge portions of the pair of vehicle panels, and that joins the outer edge portions together.

2. The vehicle panel joint structure of claim 1, wherein:
    a contact position where the rib portion contacts the hemming portion is set such that a distance from a leading end of the hemming portion to the contact position is a displacement difference or greater, wherein the displacement difference is generated at the pair of vehicle panels due to the difference in the linear expansion coefficients of the pair of vehicle panels.

3. The vehicle panel joint structure of claim 1, wherein:
    the adhesive layer is formed in a gap between the hemming portion of the first vehicle panel and the end portion at the outer edge portion of the second vehicle panel.

4. The vehicle panel joint structure of claim 1, wherein:
    the pair of vehicle panels is formed by an outer panel that is disposed at a vehicle outside and formed of a metal material, and an inner panel that is disposed at a vehicle inside of the outer panel and formed of a resin material.

5. The vehicle panel joint structure of claim 1, wherein:
    the outer edge portion of the first vehicle panel and the outer edge portion of the second vehicle panel face each other through mutual faces, and a distance between outer edge portions of the facing pair of vehicle panels is determined by the displacement difference generated at the pair of vehicle panels due to the difference in the linear expansion coefficients of the pair of vehicle panels, and by a stretch ratio of the adhesive layer due to a change in temperature.

6. The vehicle panel joint structure of claim 5, wherein:
    the distance between outer edge portions of the facing pair of vehicle panels is determined by a distance by which the rib portion formed at the leading end of the end portion at the outer edge portion of the second vehicle panel projects out toward the hemming portion of the first vehicle panel.

* * * * *